S. S. Rain,
Cage Trap,
No 79,686.   Patented July 7, 1868.
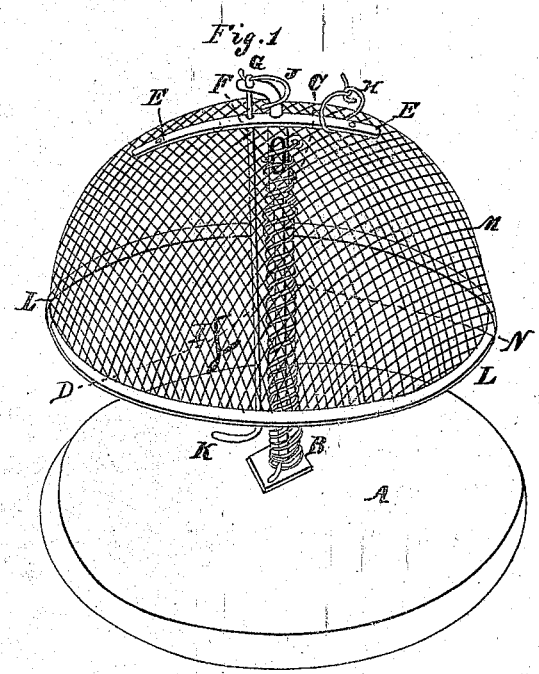
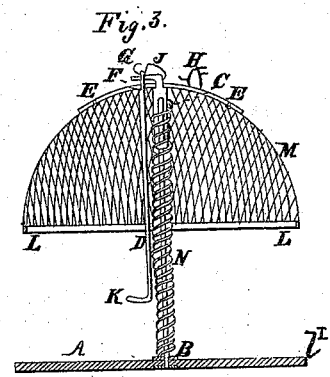
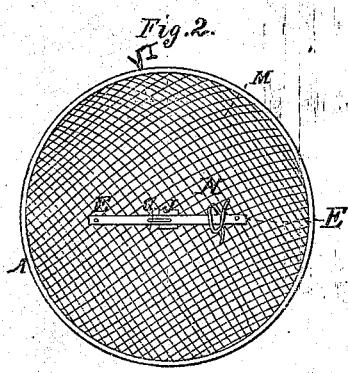
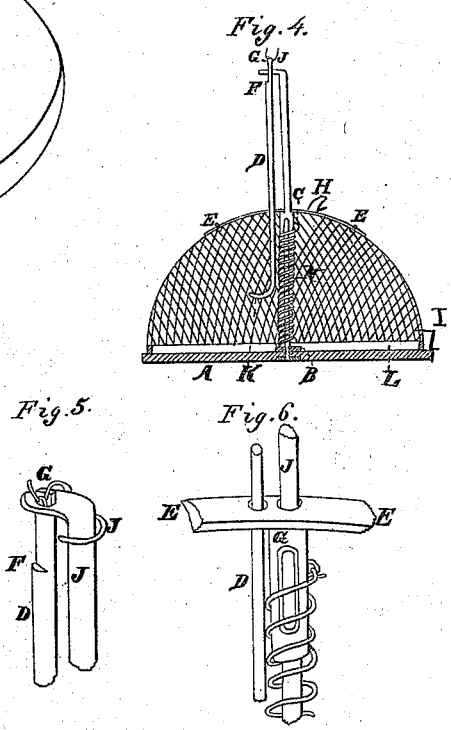
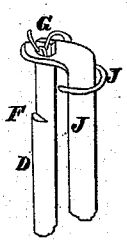
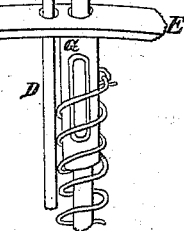
Witnesses
J. Carroll House
Geo Sherwood
Inventor.
Samuel S. Rain

United States Patent Office.

SAMUEL S. RAIN, OF LOWVILLE, NEW YORK.

*Letters Patent No. 79,686, dated July 7, 1868; antedated June 27, 1868.*

IMPROVED ANIMAL-TRAP.

*The Schedule referred to in these Letters Patent and making part of the same.*

Be it known that I, SAMUEL S. RAIN, of Lowville, in the county of Lewis, State of New York, have invented a new and useful Improvement in Animal-Traps; and I do hereby declare the following is a full, clear, and exact description of the construction and operation of the same, reference being had to the annexed drawings, making part of this specification, in which—

Figure 1 is a perspective view of the trap as set ready for use.

Figure 2 is a plan view.

Figure 3 is a sectional view of the trap, with cage raised.

Figure 4 is a sectional view, with the cage drawn or trap sprung.

Figure 5 is an enlarged view of the top of the standard, showing the attachment of the bait-hook and catch; and Figure 6 is a view of the sleeve and plate E E—

Like letters representing like parts.

Construction.

A is a circular bed-plate or base, of either wood or metal, in the centre of which is the metal standard J, the lower end of which is formed with a shoulder, and passes through the plate B, and is secured firmly by a nut upon the under side of A. Encircling the standard J, and secured to it at its lower extremity, is the spiral spring N. This spring, at its upper portion, is made fast to the sleeve C, upon the plate E, which slides freely upon the standard J. To this plate E E is secured the wire cage M, or its equivalent, by rivets at each end. The upper end of the standard J is bent at a right angle, and pierced with a hole vertically, and from this depends the bait-hook K D, passing through an opening in the plate E. At F there is a small notch in the bait-hook, which serves as a detent to hold the cage M supported, as at fig. 3. H is a ring, by which the cage is raised in the act of setting the trap. I is a lock or catch, by which the cage is kept down, when desired, and is automatic.

Operation.

We will consider the trap in the position represented in fig. 4. Now, to set the trap, place the thumb of the right hand upon the top of the standard J, passing the second finger through the ring H, and raising the cage to near the top of the standard. The notch F upon the bait-hook passes through the opening in the plate E, and the plate, resting upon this notch, supports the cage. At this point, now, we will place a suitable bait upon the hook K, and wait the appearance of the animal for which the trap is designed. Upon the approach of the game, the animal places its mouth to the bait, and, in the act of nibbling, the pressure upon the bar K D disengages the notch F from the plate E, and the cage, being thus released of its support, is at once drawn down by the recoil of the spring N. The animal is thus strongly entrapped.

The lock I is so formed that, as the cage descends, the rim strikes upon one arm of the same. This brings the other arm, which is formed in the shape of a lock, over into the mesh of the wire cloth forming the cage, making a secure fastening for the trap.

Having thus described the construction and operation of my invention, disclaiming the use of the suspended cage M, as covered by a former patent granted to me, September 10, 1867, what I claim as my improvement and invention, and desire to secure by Letters Patent, is—

The use of the within-described combination of devices, for the object and purpose here set forth.

SAMUEL S. RAIN.

Witnesses:
GEO. SHERWOOD,
J. CARROLL HOUSE.